United States Patent [19]

Fellinger

[11] Patent Number: 4,847,543
[45] Date of Patent: Jul. 11, 1989

[54] MOTION CONTROL DRIVE INTERFACE

[75] Inventor: David Fellinger, Westlake Village, Calif.

[73] Assignee: Ultimatte Corporation, Reseda, Calif.

[21] Appl. No.: 179,560

[22] Filed: Apr. 8, 1988

[51] Int. Cl.$^4$ .................................................. G05B 11/01
[52] U.S. Cl. ....................................... 318/628; 318/5; 318/12; 318/648; 354/293; 352/243
[58] Field of Search .............. 318/5, 12, 15, 648, 318/649, 628, 35; 352/243; 354/160, 189, 293

[56] References Cited

U.S. PATENT DOCUMENTS

| | | | |
|---|---|---|---|
| 3,164,838 | 1/1965 | Heinrich | 352/243 |
| 3,182,577 | 5/1965 | Ohnaka | 354/160 |
| 3,437,753 | 4/1969 | Stith | 352/243 |
| 3,561,343 | 2/1971 | Plummer . | |
| 3,693,066 | 9/1972 | Friedman et al. | 318/576 |
| 3,866,048 | 2/1975 | Gieschen et al. . | |
| 3,986,090 | 10/1976 | Hecker et al. | 318/17 X |
| 4,107,590 | 8/1978 | Pury et al. | 318/628 |
| 4,142,139 | 2/1979 | Slaats et al. | 318/648 X |
| 4,163,929 | 8/1979 | Janu | 318/628 |
| 4,278,920 | 7/1981 | Ruoff | 318/2 |
| 4,342,951 | 8/1982 | Muller | 318/628 X |
| 4,473,786 | 9/1984 | Miyashita et al. | 318/602 |
| 4,587,471 | 5/1986 | Barthelemes | 318/628 |
| 4,655,567 | 4/1987 | Morley | 354/293 |
| 4,673,268 | 6/1987 | Wheeler et al. | 352/243 |
| 4,720,805 | 1/1988 | Vye | 352/243 |

Primary Examiner—Benjamin Dobeck
Attorney, Agent, or Firm—Blakely, Sokoloff, Taylor & Zafman

[57] ABSTRACT

A man to machine interface for the control of video or motion picture camera movement for use with a camera aiming system which can reproduce a specific camera movement any number of times. The interface moves the camera in the pan or tilt axis giving an operator a natural control feel while actually driving the camera movement with a motor drive. A shaft encoder detects the velocity of the motor drive and stores such information over time in a memory. The data stored in the memory may be read out at a later time and used by the motor drive to replicate the movement of the camera.

7 Claims, 3 Drawing Sheets

MOTION CONTROL DRIVE INTERFACE

BACKGROUND OF THE INVENTION

1. Field of the Invention

This invention relates to the field of video and motion picture camera control apparatus which include the capability of repeating camera motion.

2. Prior Art

Apparatus which control the movement of a camera utilize a series of motors and gear drives and generally may be implemented in one of three ways.

(a) JOY STICK—The camera moves in real time responding to the movement of a remote control joy stick. When a joy stick is used, the camera is always motor positioned and the incremental position data may be gathered to facilitate repeat of the motion. This type of control does not replicate "natural" camera aiming and it may be difficult for an experienced cameraman to become accustomed to this type of operation.

(b) COMPUTER CONTROL—Computers have been programmed and customized for motion control work. When computer control is used the position information is usually recorded by typing or otherwise loading coordinate information into a computer terminal. This motion control system can duplicate any motion any number of times because the motion sequence is always motor controlled and position data can be stored in non-volatile memory. The disadvantage of this type of control is that the camera movement is programmed by a computer operator on a frame by frame basis which makes it difficult to use in real time for live subjects.

(c) MOTION ENCODERS—Motion control systems have been designed which encode the position of a camera aiming device utilizing shaft encoding techniques. These incremental movements are recorded in a memory then later played back through a motor control system which attempts to reproduce the movement. A problem with this type of control is that the motor system may not be capable of the accelerations or speeds which may be needed to completely reproduce the movement involved.

SUMMARY OF THE INVENTION

A man to machine interface is disclosed for the control of video or motion picture camera movement for use with a camera aiming system which can reproduce a specific camera movement any number of times. The interface moves the camera in the pan or tilt axis giving an operator a natural control feel while actually driving the camera movement with a motor drive. A shaft encoder detects the velocity of the motor drive and stores such information over time in a memory. The data stored in the memory may be read out at a later time and used by the motor drive to replicate the movement of the camera.

DETAILED DESCRIPTION OF THE INVENTION

Video cameramen are accustomed to aiming a camera by grasping and moving an extended control handle (or pair of control handles for large cameras) which is attached directly to a camera mounting head. Mechanical friction devices within the mounting head itself smooth the motion somewhat and the control handle length gives the cameraman some mechanical advantage over these friction devices. The camera must be precisely balanced to maintain its position when the control handle is released. The friction mechanism in the head is adjusted to a high enough value to compensate relatively high positive or negative tilt angles because high tilt angles tend to unbalance the mechanical system. In the case of large studio cameras, it is generally not possible to have enough friction to prevent undesired motion at steep tilt angles.

The present invention is directed to an apparatus utilizing the inputs of the cameraman as forces on the control handle. These forces are converted to motor drive signals which finally control the camera position.

Figure 1A:
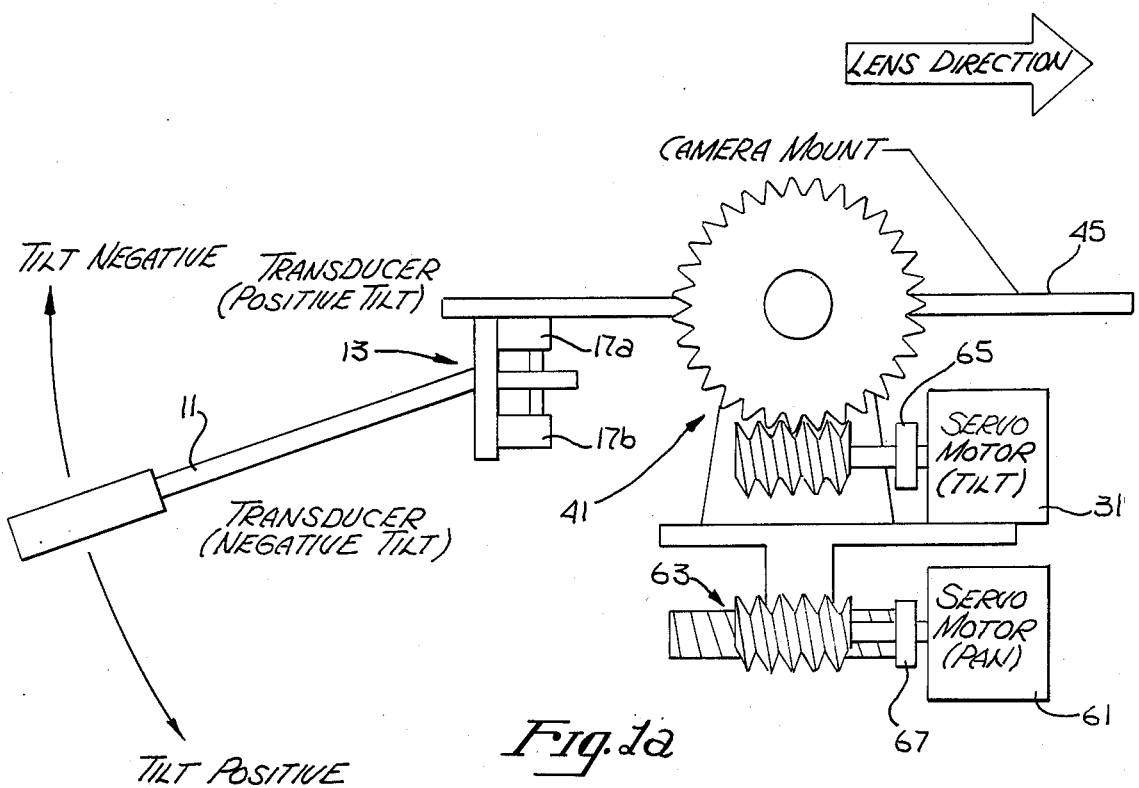
FIG. 1a is a side view mechanical schematic of the invented control apparatus.
Figure 1B:
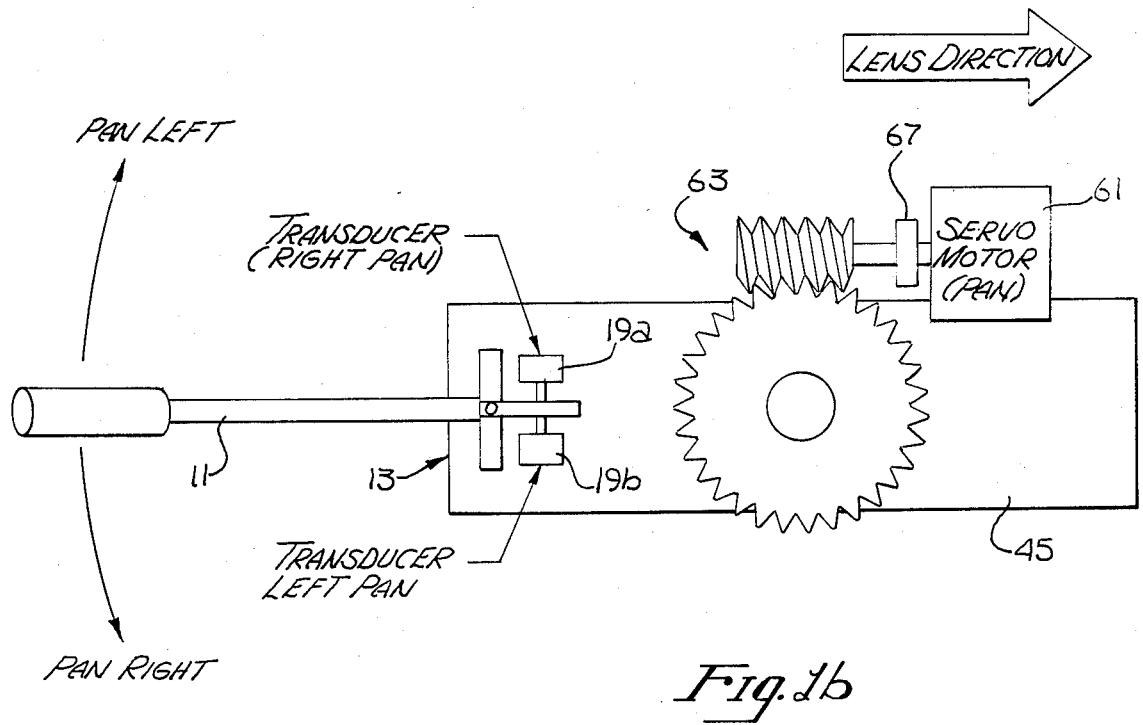
FIG. 1b is a bottom view mechanical schematic of the invented control apparatus.

FIGS. 1a and 1b are mechanical schematic diagrams of the invention. A control handle 11 is mounted in a universal mount 13 which allows movement in any direction. When the handle is moved, an imperceptible amount of the pressure exerted is coupled to one or more of four pressure transducers namely positive tilt transducer 17a, negative tilt transducer 17b, right pan transducer 19a, and left pan transducer 19b. These transducers convert the pressure into a proportional voltage. Light pressures produce a slight voltage while increasing pressures produce a larger voltage.

Figure 2:
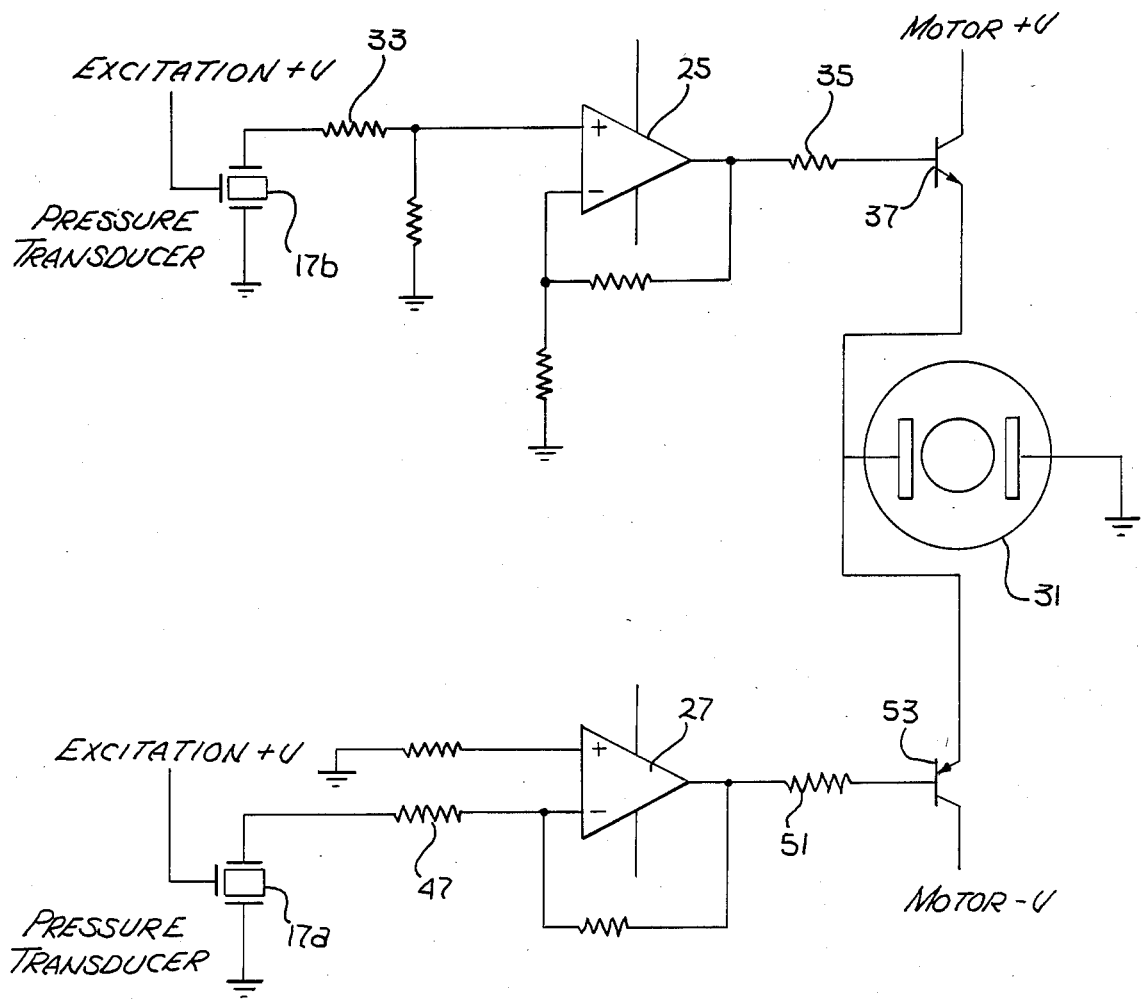
FIG. 2 is a schematic diagram of a circuit for driving a servo motor using two pressure transducers.

For tilt movements, the voltage produced by transducers 17a or 17b is amplified in amplifiers 25 and 27 respectively as illustrated in FIG. 2. A servo motor 31 then moves the camera and the handle mount 13 in a direction to respond to and reduce the applied pressure. As an example, if the handle is lifted to tilt the camera in a negative direction, pressure is applied to negative tilt transducer 17a. This transducer is coupled to resistor 33 in FIG. 2. The subsequent positive voltage produced is amplified in amplifier 25. The DC output of amplifier 25 is connected through resistor 35 to transistor 37. The emitter of transistor 37 is connected to servo motor 31 and drive current flows through motor 31 to ground. When motor 31 begins to rotate, its power is coupled by worm drive 41 illustrated in FIG. 1a, and mount 45 tilts in the negative direction. This tilting action also begins to move the control handle mount 13 and the cameraman feels the motion of control handle 11 as a reaction to his input. The cameraman feels that he is actually moving the camera, however, the camera is actually being moved by motor 31.

If the cameraman pushes downward on the handle, positive tilt transducer 17a will produce an output connected to the negative input of amplifier 27 by resistor 47. This positive voltage is inverted by amplifier 27. The inverted output coupled through resistor 51 and transistor 53 causes a current to flow in servo motor 31 which is opposite to that produced by the action of transducer 17b. Motor 31 rotates and the cameraman again feels the mount react to his pressure input.

In a similar manner, pan left and right movements are coupled through transducers 19a and 19b to the pan servo motor and worm drive 63 with a circuit virtually identical to the circuit of FIG. 2.

If greater pressures are used on handle 11, motors 31 and 61, as the case may be, turn more rapidly causing the camera to turn more rapidly, just as in a friction type mount. When motors 31 and 61 rotate, the motion is sensed by shaft encoders 65 and 67 coupled to the same respective shafts as worm drives 41 and 63. This bidirectional incremental data can be recorded in a memory such as a floppy disk for later translation to control voltages with a micro-computer. The motion of this mount system can then be repeated any number of times.

The disclosed movement control interface has major advantages over the existing technology. First, the "feel" of the system makes it seem to a cameraman as a normal friction mount. An experienced cameraman will perceive this device as a very smooth feeling camera mount with no tendency to stick-slip as a friction device might. Second, this device works well in live action situations because the cameraman simply performs his normal job and the camera mount responds. If the control handle is released at any time, the last position will be retained and locked by the worm drive with no tendency to drift or move in any position. Finally, the incremental motion recorded from the haft encoders will represent motion that can be attained and repeated by the motors because the motors caused the motion initially.

In practical use there are other advantages which make this device preferable to other means of aiming a camera. The output of the pressure transducers may be digitized and modified by a microprocessor before moving the motors. This could happen quickly enough to retain the natural feel of the system, but other controls may be added such as limit controls which would stop the movement of the mount in any direction in a controlled deceleration. This gives the cameraman the ability to set stage limits before the shooting sequence to avoid overshooting the scene. Acceleration limits could be defined to smooth the motion of the cameraman in slow moves or speed the motion for quick moves with a minimum of force exerted. Finally, the force needed to move the mount at any continuous speed can be user selectable at the mount itself to thereby optimize the mount for any user.

Figure 3:
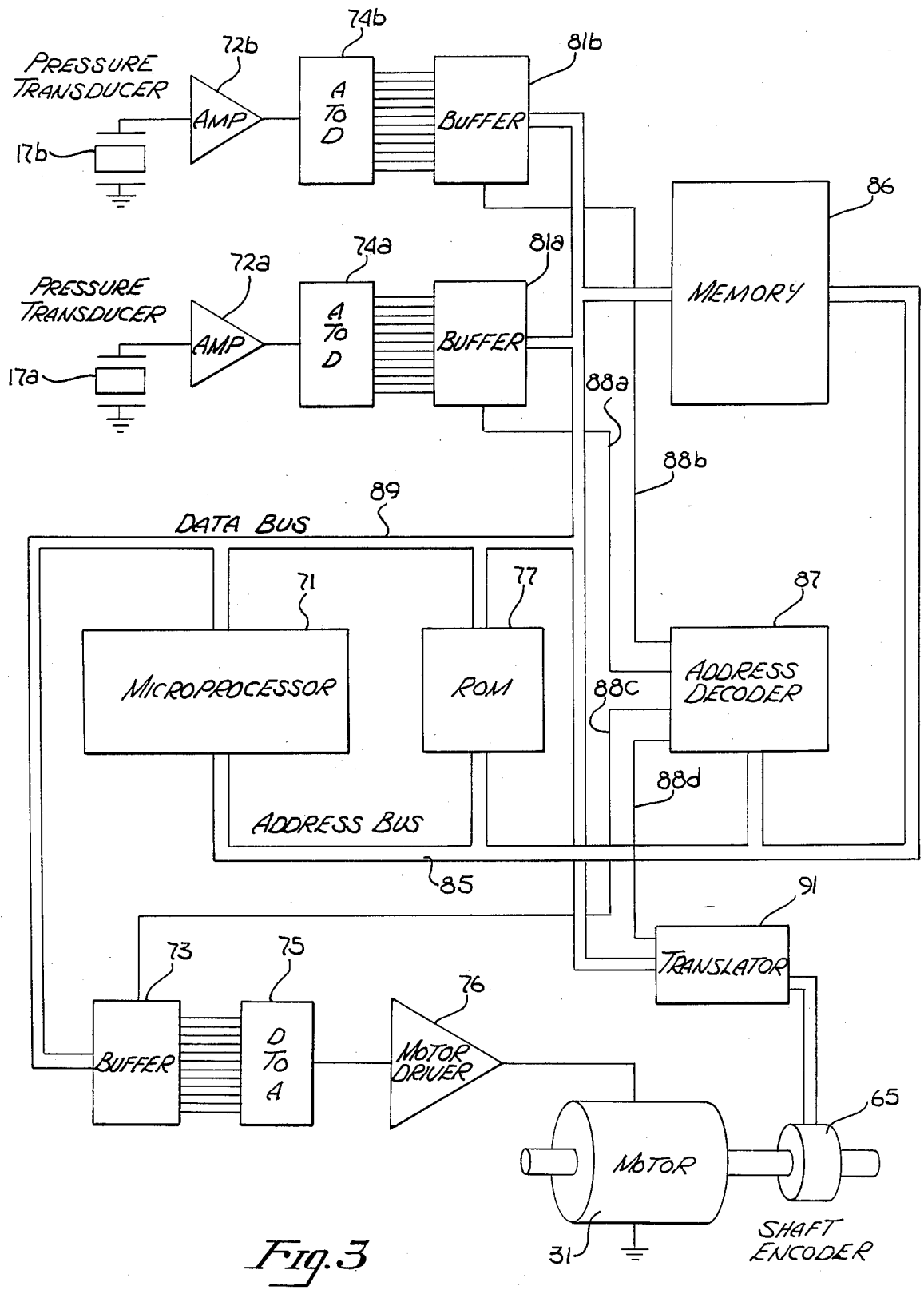
FIG. 3 is a block diagram of a microprocessor based circuit for driving a servo motor using two pressure transducers and recording camera motion in a memory.

FIG. 3 illustrate an embodiment of the present invention wherein a microprocessor 71 is used to drive motors 31 and 61. FIG. 3 illustrates only motor 31, tilt transducers 17a and 7b and shaft encoder 65. Adding the components necessary to drive motor 61 based upon inputs from pan transducers 19a and 9b and shaft encoder 67 would be obvious to those skilled in the art and are therefore not shown in FIG. 3. Also not shown are the various control and clocking signals necessary for proper operation of microprocessor 71 and the other digital components shown in FIG. 3. However, the particulars of such signals would be readily apparent to those skilled in the art.

The microprocessor (MPU) based embodiment of the invention operates on a fully closed-loop basis. As illustrated in FIG. 3, MPU 71 can address as inputs the digitized form of pressure transducers 17a and 17b outputs as well as the buffered output of shaft encoder 65. The MPU can also address a motor driver 76 through a digital to analog converter 75. In actual operation, control code residing in a read-only-memory (ROM) 77 directs MPU 71 in the following sequence:

1. Address the data present in pressure transducer buffers 81a and 81b and determine if a change in motor motion is necessary.
2. If a change in motor motion is necessary, place an output word in buffer 73 which is based on three factors: pressure, current motor velocity (as input from the shaft encoder 65), and maximum allowable motor acceleration.
3. Branch to step 1.

The control code in ROM 77 would depend upon the particular components selected to implement the circuit of FIG. 3 and the desired functionality, e.g., whether stop limits or acceleration limits and the like are implemented. However, the details of such code would be readily apparent to one skilled in the relevant art.

Further details regarding the operation of the circuit of FIG. 3 are as follows. When handle 11 applies pressure to pressure transducer 17a or 17b, a voltage is generated and amplified by amplifiers 72a and 72b respectively. The amplified voltage is digitized by analog to digital converters 74a and 74b respectively for storage in buffers 81a and 81b respectively. MPU 71 places signals on address bus 85 which, when decoded by address decoder 87, generate a control signal on line 88a or 88b causing buffer 81a or 81b respectively to place its contents on data bus 89. Once on the data bus, such data may be analyzed by MPU 71 to ensure, for example, that preset limits will not be exceeded. Other analysis performed by MPU 71 could ensure that the "feel" of the camera is the same as if a friction mount were being used by controlling acceleration and deceleration as described below. The data from buffer 81a or 81b, or the data as modified by MPU 71 after analyzing such data, may then be loaded into buffer 73 by placing an appropriate signal on address bus 85 to cause address decoder 87 to assert line 88c. The data in buffer 73 is then converted to analog form by digital to analog converter 75, which analog signal is used by motor driver 76 to drive motor 31.

Shaft encoder 65 detects the angular velocity of the shaft of motor 31, generating a signal which is input to translator 91. Translator 91 converts the output of shaft encoder 65 into a digitized from which may be placed on bus 89 by placing an appropriate address on address bus 85 for decoding by address decoder 87 which asserts line 88d. The data on bus 89 may then be stored in memory 86 by MPU 71.

Camera repeat motion is performed when microprocessor 71 uses data stored in memory 86 rather than data from buffers 81a and 81b to drive motor 31 as explained in further detail below.

If a strong pressure is applied to the control handle, then released at a later time, the resulting motor velocity could be characterized by a trapezoidal velocity profile. That is, the motor would accelerate at a fixed rate to the controlled maximum velocity, continue at the controlled maximum velocity while pressure is maintained on the handle, then would decelerate to zero velocity at a similar negative fixed rate. If smaller pressures are applied to the control handle, then motor velocities could occur which never approach the software controlled acceleration limits.

The controlled acceleration limits are important in imparting a natural "feel" to the control system. A cameraman is accustomed to the natural angular momentum of a camera mounted on a conventional head.

In this microprocessor based control embodiment, a fixed force on the control handle will produce an eventual fixed velocity, but the cameraman will "feel" some initial resistance to his inputs which will be perceived as normal angular acceleration of the camera. If the cameraman released the control handle during a move, the camera will decelerate on a fixed ramp which again will be perceived as the result of the angular momentum of a purely mechanical system.

The positions per unit of time of the system a translated by shaft encoder are stored in memory 86 by MPU 71. Memory 8 then contains data which accurately describes the original motion of the camera, which can then replicate a stored motion without input from the control handle. In this operating mode, the accelerations and decelerations of the motor are a part of the "remembered" data and are not processed or masked further.

In the preferred embodiment, memory 86 is a floppy disk which stores absolute position data from shaft encoders 65 and 67 with respect to a time code or sync count associated with the camera. Such code or count may be generated by a SMPTE time code generator or by shutter sync data from a motion picture camera. Of course, such absolute position data is relative positional data with respect to camera motion. Thus, in order to allow the camera to start at a desired position such that the scene recorded during the repeat motion of the camera is what is desired to be recorded, a switch (not shown) must be provided which will disengage the camera head from the drive assembly so that the camera may be freely moved to a desired location. This may be best illustrated by the following example.

Assume that a camera is panning a background scene which will be used to form a composite image in which a foreground scene is created with an actor walking across a stage (with a blue backing). In this connection, the background scene could be shot with a left to right pan with the positional information being stored in memory 86. When the foreground scene is shot, the camera head would be disengaged and pointed at a position from which a left to right five second pan could take place without going off the blue backing. Of course, the left to right pan would be performed by using the data in memory 86. If the initially selected start position was such that the left to right pan caused the camera to go off the backing, the start position could be reset and the camera movement repeated until an acceptable start point is established. Once the camera is positioned at the desired starting point, the actor can be instructed to walk across the stage while the foreground scene is being recorded by the repeat motion of the camera.

Similarly, if it is desired to first record the foreground scene which will be used to form a composite image with a background scene taped at a later time, after the foreground scene is shot, the camera would be moved to the location where the background scene is to be shot. The camera head would then be disengaged as described above and pointed at a position so that when the camera is move according to the data in memory 86, desired portions of the background scene are included. Of course, if the initially selected position is incorrect for any reason, the background scene may be reshot as many times as necessary since the precise camera movement which is required is stored in memory 86.

Components

The present invention may be implemented with a variety of readily commercially available components. In this connection, the following is provided for purposes of illustration only and is not intended to limit the scope of the invention in any manner.

Servo motors 31 and 61 may be DC brushless motors such as Series 5111 winding #4 available from Pittman. Suitable pressure transducers 17a, 17b, 19a and 19b are available from Omega namely its Model Y series HBM3/120LY11 Shaft encoders 65 and 67 may be implemented using Hewlett Packard HEDS-6010 1024 line encoders.

Amplifiers 72a and 72b are National Semiconductor part number LF347. A to D converters 74a and 74b are Intersil part number AD0802. Buffers 81a and 81b are Integrated Device Technology part number 74FCT821A. Microprocessor 71 is a Hitachi HD64180 RCP-8Y. ROM 77 is Intel part number 2764. Memory 86 is any standard 3.5 inch floppy disk and controller. Memory 86 may also be a RAM such as RCA part number 6164.

Address decoder 87 may be implemented using an Intel 8131 bus comparator. Buffer 73 is an Integrated Device Technology part number 74 FCT825A. D to A converter 75 is an Intersil part number AD7533. Translator 91 is a Hewlett Packard part number HCTL-2000.

Of course, the circuitry of FIG. 3 may be implemented using parts equivalent to the foregoing.

I claim:

1. A motion control apparatus for a video or motion picture camera having a camera mount comprising:
   a control handle fixedly coupled to said camera mount;
   pressure transducer means coupled to said control handle for generating electrical signals corresponding to a direction and velocity of desired motion of said camera;
   first motor means coupled to said pressure transducer means for moving said camera in a left pan and a right pan direction;
   second motor means coupled to said pressure transducer means for moving said camera in a positive tilt and negative tilt direction;
   first worm drive means coupled to said first motor means and said camera mount for converting an angular velocity generated by said first motor means into a pan left or pan right motion of said camera;
   second worm drive means coupled to said second motor means and said camera mount for converting an angular velocity generated by said second motor means into a positive tilt or negative tilt motion of said camera.

2. The apparatus defined by claim 1 wherein said first and second worm drive means lock said camera in a position when said pressure transducer means ceases generating electrical signals, said position determined by the position of said camera when said electrical signals ceased being generated.

3. The apparatus defined claim 1 further comprising means for controlling the acceleration and deceleration of said first and second motor means to simulate the acceleration and deceleration of a camera having a friction mount.

4. The apparatus defined claim 1 further comprising means for controlling the limits of said camera in said pan left and pan right directions and said positive tilt and negative tilt directions.

5. The apparatus defined by claim 1 further comprising:
- a microprocessor;
- first and second shaft encoder mean coupled to said first and second motor means respectively for generating second electrical signals corresponding to the angular velocity generated by said first and second motor means respectively;
- memory means for storing said second electrical signals; and
- playback means for using said second electrical signals stored in said memory to repeat the motion of said camera based upon said stored second electrical signals.

6. The apparatus defined by claim 5 wherein:
- said first and second motor drive means each comprise a motor having a shaft;
- said first and second shaft encoder means each comprise a shaft encoder coupled to the shafts of said motors and a translator means coupled to said shaft encoder for converting the electrical signals generated by said shaft encoder into digital signals;
- said memory means comprises magnetic storage media;
- said play back means comprises said memory means and said microprocessor, wherein the data stored in said memory means is read out from said memory means under control of said microprocessor and converted into electrical signals for use by said first and second motor means.

7. The apparatus defined by claim 3 wherein said means for controlling the acceleration and deceleration of said first and second motor means comprises:
- a microprocessor coupled to a memory which stores control code;
- buffer means coupled to said pressure transducer means for storing pressure data representing the amount of pressure applied to the pressure transducer means;
- shaft encoder means coupled to said first and second motor means for generating rotation data representing the rotational velocity of each of said first and second motor means;
- second buffer means coupled to said first and second motor means for storing voltage data generated by the microprocessor operating under control of the control code;
- means for converting said voltage data to first and second voltages for driving said first and second motor means;
- wherein said control code causes said microprocessor to generate said voltage data based upon said pressure data, said rotation data and a predetermined constant representing a maximum rotational acceleration of said first and second motor means.

* * * * *

UNITED STATES PATENT AND TRADEMARK OFFICE
CERTIFICATE OF CORRECTION

PATENT NO. : 4,847,543
DATED : 7/11/89
INVENTOR(S) : Fellinger

It is certified that error in the above-identified patent and that said Letters Patent is hereby corrected as shown below:

| | | |
|---|---|---|
| col. 03, line 52 | delete "7b" | insert --17b-- |
| col. 03, line 54 | delete "9b" | insert --19b-- |

Signed and Sealed this

Ninth Day of April, 1991

Attest:

HARRY F. MANBECK, JR.

Attesting Officer

Commissioner of Patents and Trademarks